United States Patent [19]

Hodgson

[11] 4,280,867
[45] Jul. 28, 1981

[54] GLYCOL REGENERATION

[75] Inventor: Robert A. Hodgson, Tulsa, Okla.

[73] Assignee: Maloney-Crawford Corporation, Tulsa, Okla.

[21] Appl. No.: 46,784

[22] Filed: Jun. 11, 1979

[51] Int. Cl.³ .............................................. B01D 1/14
[52] U.S. Cl. ..................................... 159/47 R; 55/32; 159/16 R; 159/31; 568/868
[58] Field of Search ....................... 203/12, 14, 18, 39, 203/42, 49; 55/32; 159/31, 16 R, 47 R; 568/868, 871

[56] References Cited

U.S. PATENT DOCUMENTS

| 3,361,649 | 1/1968 | Karter | 159/31 |
| 3,648,434 | 3/1972 | Gravis et al. | 55/32 |
| 3,841,382 | 10/1974 | Gravis et al. | 55/32 |
| 4,070,231 | 1/1978 | Alleman | 55/32 |

Primary Examiner—Frank Sever
Attorney, Agent, or Firm—Head & Johnson

[57] ABSTRACT

A system for regeneration of a liquid disiccant which utilizes a reboiler and still column to remove a major portion of absorbed water and then exposes the hot, partially dehydrated desiccant to a flow of dry, inert flue gas and a partial vacuum, in order to remove additional water from the desiccant.

5 Claims, 1 Drawing Figure

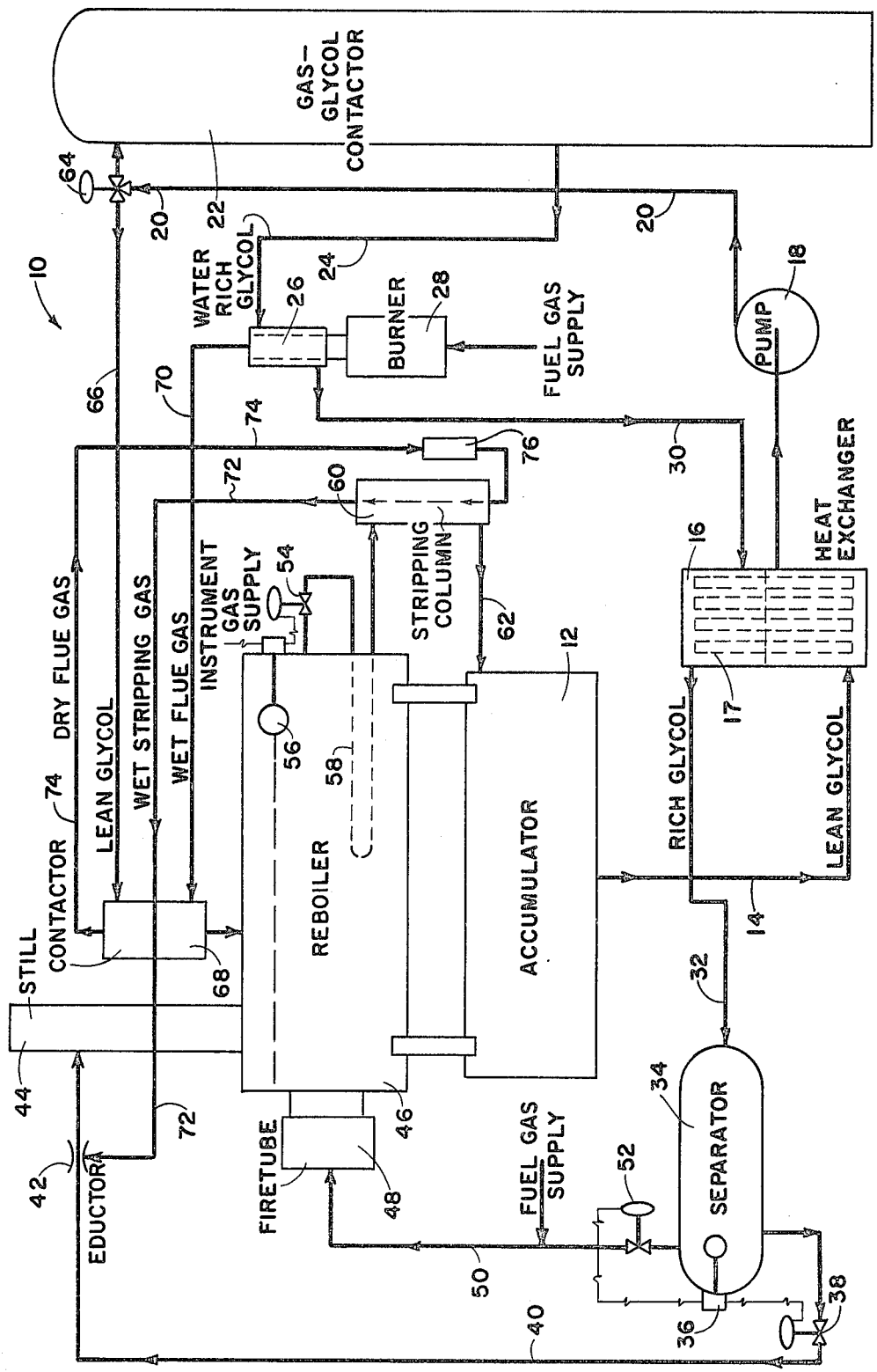

GLYCOL REGENERATION

BACKGROUND OF THE INVENTION

1. Field of the Invention

The present invention relates to a method of regeneration of liquid desiccant, such as glycol, and more particularily, to such a method which utilizes heat, a vacuum and inert flue gas as a stripping media.

2. Description of the Prior Art

Liquid desiccants, such as diethylene and triethylene glycol are commonly used for dehydrating natural gas streams. The dehydration occurs by the mixing of the liquid desiccant with the gas stream and the removal of water therefrom because of the greater affinity of water for glycol than for the natural gas. The moisture laden glycol is collected and is heated above the boiling point of water in order to drive-off the water from the glycol. The dehydrated or lean glycol is then recycled into contact with the natural gas stream.

The regeneration of glycol by boiling is not sufficient to fully remove the water from glycol, therefore various additional stripping systems have been used. Glycol regeneration systems utilizing natural gas as a stripping medium to obtain higher glycol reconcentration, which will in turn produce greater dew point depression, have been used in dehydration systems for a number of years. Due to the rising cost of natural gas, it has become necessary to find a substitute for the use of natural gas as a stripping medium.

Air is one alternative to the use of natural gas as a stripping medium, however, this has not proved to be a satisfactory alternative due to the possibility of degradation of the glycol when stripped with air.

SUMMARY OF THE INVENTION

The present invention generally provides a system for removing water from water-rich liquid desiccant. The system utilizes a reboiler and still column to remove a major portion of absorbed water, while the improvement being the exposure of the hot, partially dehydrated desiccant to a flow of dry, inert flue gas and a partial vacuum, in order to remove additional water from the desiccant.

BRIEF DESCRIPTION OF THE DRAWING

FIG. 1 is a semi-diagrammatic illustration of a liquid desiccant regenerator apparatus embodying the present invention.

DETAILED DESCRIPTION OF THE PREFERRED EMBODIMENT

Referring to the drawing in detail, reference character 10 generally indicates a regenerator apparatus for reconcentrating liquid desiccant, such as diethylene or triethylene glycol. Glycol is stored within an accumulator 12 and flows therefrom by a line 14 through the lower portion of a heat exchanger 16, which contains a multiplicity of heat pipes 17, to a pump 18, whereupon the glycol is pumped through line 20 to a gas-glycol contactor 22. Inside the contactor 22, the glycol passes concurrent to a stream of natural gas, whereby dehydration of the gas occurs by the mixing of the gas stream with the glycol and the removal of the water from the gas stream because of the greater affinity of water for glycol than the gas stream.

The now wet, cool glycol exits the contactor 22, by a line 24, and is heated by passing through a heat exchanger 26. The heat exchanger 26 is mounted upon a catalytic burner 28 which burns gas from a fuel gas supply (not shown) and which produces hot inert flue gas, which passes through the heat exchanger 26 and is further used within the apparatus 10 (as will be described below).

The glycol flows from the heat exchanger 26 by a line 30, through the upper portion of the heat exchanger 16. In contacting the condensing or upper portion of the heat exchanger 16, the wet cool glycol absorbs heat from the hot glycol flowing from the accumulator 12 through the lower portion of the heat exchanger 16. The glycol passes by line 32 to a separator means 34, where absorbed natural gas within the glycol is flashed off to be used as fuel within the apparatus 10. The level of glycol within the separator 34 is maintained by a level control means 36, which is in communication with an output flow valve 38.

The glycol from the separator 34, flows through the output valve 38, by a line 40, through a venturi eductor 42, and then into a still column 44. The glycol flows downward within the still column 44 and into a reboiler 46. Within the reboiler 46, the glycol is heated by means of a fire tube 48 above the boiling point of water, approximately 400° maximum for TEG, but below the temperature of thermal degradation of the glycol, whereby the absorbed water is separated from the glycol and the water vapor is discharged through an exit (not shown) within the top portion of the still column 44. The fire tube 48 is provided with a gas supply by a line 50 from a fuel gas source (not shown) and the separator 34; fuel gas from the separator 34 passes through a gas back pressure valve 52, which is in communication with level means 36 within the separator 34, and which maintains the fuel gas and instrument gas supply at the predetermined pressure.

The dehydrated glycol flows from the reboiler 46, through a level control valve 54, which is in communication with a float means 56, within the reboiler 46, and back through a reheat coil 58, located within the reboiler 46. The glycol then flows through a stripping column 60 wherein the glycol comes into contact with dry flue gas which removes additional amounts of water from the glycol. The lean glycol flows from the stripping column 60 by a line 62, into the accumulator 12, where the regeneration cycle is repeated.

The inert flue gas, approximately 10% carbon dioxide and 90% nitrogen, used within the stripping column 60 is generated by the catalytic burner 28 at the rate of 10 cubic feet of inert gas per cubic foot of natural gas burned. Since the inert flue gas is saturated with water vapor upon leaving the catalytic burner 28, it must be dried before being used as a stripping medium. In order to remove the water vapor from the inert flue gas, a side stream of lean glycol is diverted from line 20 by means of a splitter valve 64, and is fed by a line 66 to a contactor means 68. The lean glycol within the contactor 68 comes into contact with the wet flue gas from the burner 28, which is fed by a line 70, thereby absorbing water vapor from the flue gas. The glycol flows from the contactor 68 into the reboiler 46, in order to be regenerated. To provide means for the movement of the flue gas, a suction line 72 from a low pressure portion of the eductor 42 is connected to the top of the stripping column 60. This enables the dried flue gas, which is drawn from the contactor 68, to pass by a line 74 through the stripping column 60, and the resulting wet flue gas is fed back to the still column 44 by line 72.

A rotameter 76, located along the line 74 measures the amount of stripping gas used. Optionally, a pneumatic output (not shown) on the rotameter 76, in communication with the splitter valve 64, may be used to automatically adjust the flow of the glycol side stream.

Whereas the present invention has been described in particular relation to the drawings attached hereto, it should be understood that other and further modifications of the invention, apart from those shown or suggested herein, may be made within the scope and spirit of this invention.

What is claimed is:

1. In a method for reconcentrating a liquid desiccant used in dehydrating a stream of gas including a still column and fire-tube reboiler, an accumulator, a gas-desiccant contactor, and means to circulate said desiccant from said accumulator to said contactor and to said still column and reboiler and to return to said accumulator; the improvement in further reconcentrating said liquid desiccant comprising providing a catalytic burner system; continuously producing inert gas in said burner system for use in the method; heat exchanging water-rich desiccant from said gas-desiccant contactor with said flue gas to produce hot, rich desiccant; heat exchanging said hot, rich desiccant with lean desiccant from said accumulator; introducing said rich desiccant to said still column through an eductor; contacting a portion of said lean desiccant with said flue gas to produce dry flue gas and a resulting rich desiccant stream, which is introduced into said reboiler; and drawing said dry flue gas by a vacuum produced by said eductor into a desiccant stripping column where additional water is removed from said desiccant.

2. In a method for reconcentrating a liquid desiccant as set forth in claim 1 wherein said liquid desiccant is glycol.

3. In a method for reconcentrating a liquid desiccant as set forth in claim 1 wherein said stream of gas is natural gas.

4. In a method for reconcentrating a liquid desiccant as set forth in claim 1 wherein said desiccent is introduced into said stripping column after exiting said reboiler.

5. In a method for reconcentrating a liquid desiccant as set forth in claim 1, wherein absorbed gas is separated from said rich desiccant for use in said method.

* * * * *